United States Patent [19]  
Madigan

[11] 3,783,316  
[45] Jan. 1, 1974

[54] STABILIZED ROTOR CONSTRUCTION FOR WHEEL SPEED TRANSDUCER

[75] Inventor: Basil M. Madigan, Wadsworth, Ohio

[73] Assignee: The Goodyear Tire and Rubber Company, Akron, Ohio

[22] Filed: July 25, 1972

[21] Appl. No.: 274,860

[52] U.S. Cl. ................................. 310/90, 310/168
[51] Int. Cl. ............................................ H02k 5/16
[58] Field of Search ..................... 310/90, 168, 169, 310/171, 170, 75; 308/189.1, 207.1

[56] References Cited  
UNITED STATES PATENTS

| 3,500,091 | 3/1970 | Jones | 310/90 |
| 2,859,033 | 11/1958 | Rose | 308/189.1 |
| 3,686,986 | 8/1972 | Ledergerber | 308/189.1 |
| 3,217,196 | 11/1965 | Richards | 310/90 |
| 896,877 | 8/1908 | Witte | 308/189.1 |
| 1,362,910 | 12/1920 | Zoeller | 308/189.1 |
| 3,604,966 | 9/1971 | Liggett | 310/168 |

Primary Examiner—R. Skudy  
Attorney—F. W. Brunner

[57] ABSTRACT

Disclosed is a new bearing design adaptable for use between rotatably moving parts having tolerances therebetween which are subject to change due to temperature or other variations. A stationary assembly has a bearing race fixedly attached about the inner circumference thereof. A rotatable member, received within the stationary member, has a race about the outer circumference thereof substantially concentrically aligned with the fixed race. Balls are interposed between the two bearings. A spring washer operatively engages the rotatable member so as to maintain a consistent bearing engagement between the two races and the balls regardless of temperature variations or force fluctuations.

7 Claims, 3 Drawing Figures

PATENTED JAN 1 1974  3,783,316
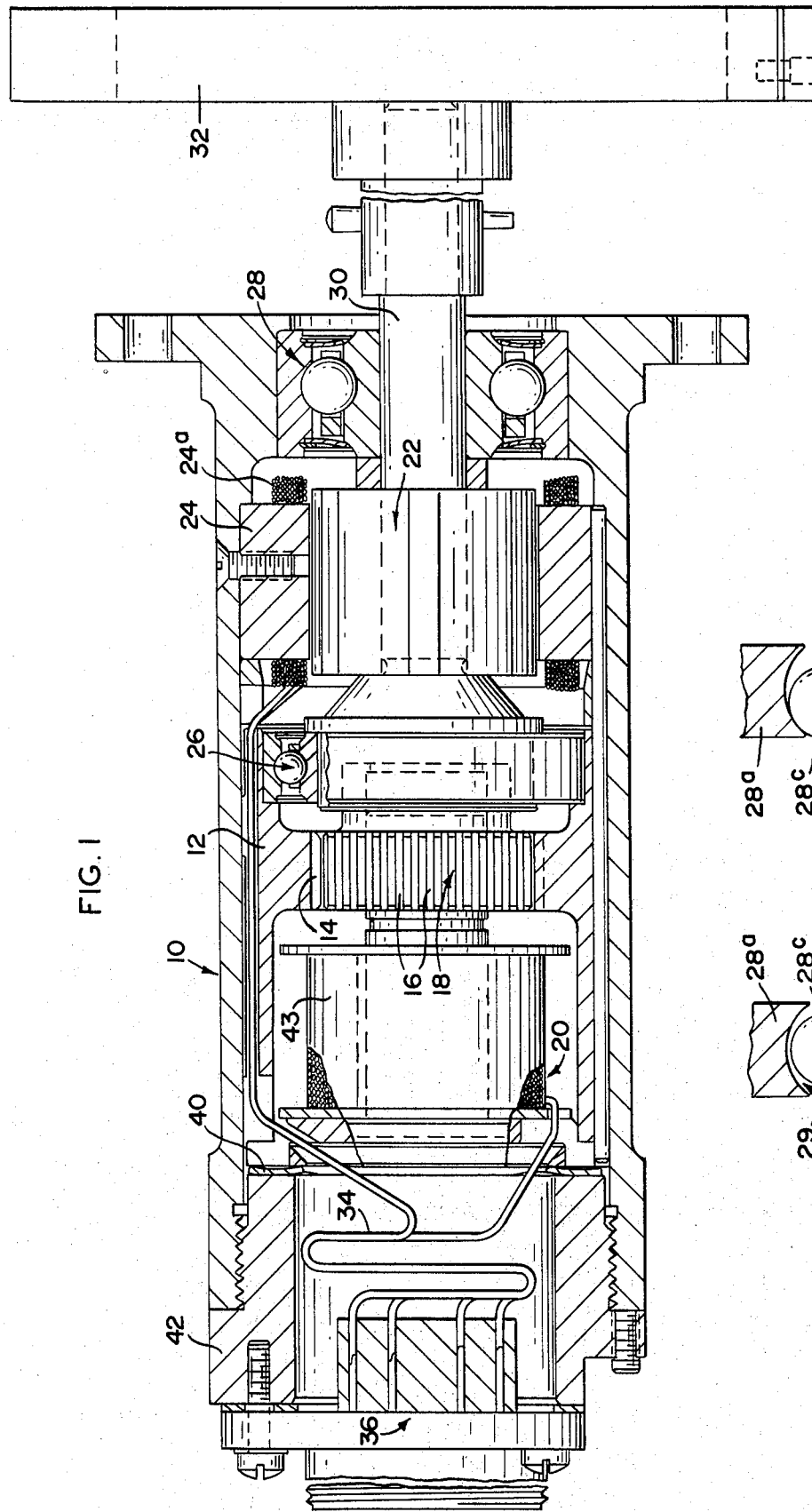
FIG. 1
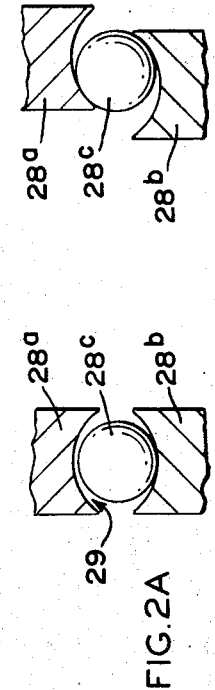
FIG. 2B
FIG. 2A

STABILIZED ROTOR CONSTRUCTION FOR WHEEL SPEED TRANSDUCER

Heretofore it has been a considerable problem in the transducer construction for a wheel speed sensor in an aircraft anti-skid braking control system to have a stablized rotor because of wide temperature variations within the transducer assembly, and the extremely rapid spin-up speeds that the rotor experiences upon wheel touchdown. Heretofore the failure of the ball bearings mounting the rotor in such transducer assembly has occurred much too frequently at considerable expense to replace, as well as endangering anti-skid operation because of such failure.

Therefore, it is the general object of the invention to solve the problem of temperature compensation in the ball bearing mountings for the rotor of an anti-skid wheel speed transducer assembly by providing a simple and highly effective solution to compensate for changes in thermal environment within the transducer assembly.

While the objects of the invention are obviously applicable to other rotor stator situations where thermal environment is a problem, the invention has been designed and illustrated herein to solve the problem in an anti-skid transducer assembly, and it will be so described. The aforesaid objects of the invention and other objects which will appear as the description proceeds are achieved by providing an apparatus to achieve a wheel speed signal adapted to be mounted in the wheel and driven by rotation thereof which comprises a housing, a stator fixed within the housing, a rotor rotatably mounted within the housing and cooperating with the stator, sensor means to generate an electrical signal when there is relative motion between the stator and the rotor, and means to effect relative movement between the stator and the rotor upon rotation of the wheel which is characterized by at least one race type ball bearing means rotatably mounting the rotor to the housing which bearing balls are in a loose fit with the races, and means to axially bias the rotor to constantly urge the bearing balls into driving bearing engagement with the races.

For a better understanding of the invention reference should be made to the accompanying drawings wherein:

FIG. 1 is a cross-sectional partially broken away illustration of the transducer assembly of the invention incorporating the bearing temperature compensation means; and FIGS. 2a and 2b illustrate the loose fit of the bearing balls in the normal unbiased condition, and in the biased bearing engaging condition, respectively.

Now, with reference to the embodiment of the invention shown in FIG. 1 of the drawings, the numeral 10 indicates a housing which carries a fixed stator or sensor unit 12 having teeth 14 cooperating with respective teeth 16 of a rotor indicated generally by numeral 18. As is well known to those skilled in the art, the stator 12 may be referred to as a sensor unit by virtue of the fact that impulses or electrical signals are induced thereinto as relative rotational movement is experienced between the rotor 18 and the stator 12. As the teeth 14 of the stator 12 move into and out of alignment with the teeth 16 of the rotor 18, a sinusoidal signal is induced into the stator 12. As is well known to those skilled in the art, the frequency of the induced sinusoidal signal is indicative of the rotational speed of the rotor 18. Consequently, the stator 12 may, in the broad sense of the term, be referred to as a sensor unit. The rotor 18 carries a shaft magnet subassembly 22. The stator 12 further carries a stator coil subassembly 24 and sensing coil 43. The rotor 18 is rotatably mounted by means of two sealed self-lubricating type ball bearings indicated generally by numerals 26 and 28. The rotor 18 has a driveshaft 30 which is adapted to be rotatably driven by a drive arm 32 normally driven by direct drive from a wheel with which the transducer assembly is associated.

Signals developed within a coil 24a surrounding the stator subassembly 24 and from the coil 43 in the pole piece subassembly 20 are detected by appropriate wires 34 and fed to provide electrical outputs to a potted pin connector indicated generally by numeral 36. Then, it should be understood that in the normal use of the transducer of FIG. 1, the housing 10 fits into the axle of the vehicle with the rotation of the wheel driving the arm 32, and the signals picked off the pins of pot connector 36 providing signals indicating wheel rotation speed. This type of assembly has long been basically utilized in anti-skid systems for aircraft, and the like. The particular transducer shown in FIG. 1 actually provides two separate signals, one from coil 24a and the other from coil 43, and hence while both signals represent the same thing, failsafe features are thereby incorporated, or the separate signals can be utilized for separate control functions.

ESSENCE OF INVENTION

The essence of the invention is achieved by purposely making the ball bearings 26 and 28 have a sloppy or loose fit between the balls and the races thereof. The bearings are typical and usual type sealed race type ball bearings such as those made by the Split Ball Bearing Corporation of Lebanon, New Hampshire or the New Hampshire Ball Bearing Company of Keene, New Hampshire, but they are manufactured to provide a specific radial play so as to achieve the sloppy or loose fit shown in FIG. 2a.

Now referring to FIG. 2a, the numeral 28a indicates the radially inner race and numeral 28b indicates the radially outer race of the ball bearing 28. Note that the ball 28c while resting by gravity on the outer race 28b actually has a clearance indicated at 29 between the ball and the inner race 28a. In the particular embodiment of the invention illustrated, with the bearing 28 having a outer diameter of approximately 1-¼ inches, the space at 29 is designed to fall in a range somewhere between about 0.0003 and about 0.002 inches, with the preferable range being between 0.0007 to 0.0009 inches. The need for the radial play occurs because of the extreme changes in temperature that arise in this transducer application to an aircraft anti-skid system. Hence, the loose ball bearings provide for temperature compensation which is especially acute in this condition because the temperature normally is much higher on the inside than the outside meaning for example with respect to FIG. 2a that the inner race 28a is going to have a higher temperature and thereby expand more than the outer race 28b.

In order to complete the thermal compensation with the sloppy bearings 26 and 28 described above, the bearing balls must be forced into sufficient bearing contact with the races so that upon rotation of shaft 30, a smooth transition without ball skidding will occur between the balls and the races in the normal ball bearing design. To this end, a spring washer 40 mounted and held in position by an end cap 42 screwed into housing 10 provides an axial thrust against the rotor 18 forcing the sloppy fit of the balls with respect to the races into the engaged position shown in exaggerated form of FIG. 2b. In any event, the bias by the spring washer 40 is constant and holds the balls into firm engagement with their respective races, regardless of what temperature may occur across the bearing itself. The spring washer is of the usual type such as those made by the Seastrom Manufacturing Company of Glendale, California, and preferably provides an axial bias sufficient to accomodate shock and vibration loads throughout axial thermal displacements.

It is apparent that the looseness or sloppy fit of the balls with respect to the races in their respective bearings is the key to the successful operation of the temperature compensated transducer of the invention. It has been found that this looseness of fit is very easily achieved by simply utilizing the same race configuration which the manufacturers normally include in their ball bearing design without looseness, but simply creating the looseness by providing a greater radial separation between the races than is present in the usual design. It has been found that this radial separation should be between about 0.05 to about 0.07 percent of the diameter of the ball bearing involved in order to provide the type of thermal compensation characteristics desired. As stated above, in the preferred embodiment of the invention, this plus fit allowance is between 0.0007 to 0.0009 inches. It should also be understood, however, that other design changes could be incorporated into the ball bearings to insure the loose or sloppy fit of the balls with respect to the races, other than a simple radial separation of the races themselves. In other words, the actual curvature of the races might be slightly varied to achieve the same result.

It has been found that utilizing the design of the invention that the life of the bearings and thereby the operating life of the transducer is greatly increased in an anti-skid aircraft brake application. The stability of the rotor is maintained by the axial bias of the spring. While the preferred embodiment illustrates two bearings mounting the rotor, and calls for the looseness with respect to both bearings, the bearing causing the majority of the problem is the bearing immediately adjacent the drive shaft and drive arm and, in many transducer designs, only that bearing might need to be made by the loose ball configuration of the invention. The amount of looseness between the balls and the races can readily be determined based upon the thermal changes which are anticipated.

While in accordance with the Patent Statutes only a preferred embodiment of the invention has been illustrated and described in detail, it is to be particularly understood that the invention is not limited thereto or thereby, but that the inventive scope is defined in the appended claims.

What is claimed is:

1. Apparatus to generate an electrical output signal which comprises a housing, a stator fixed within the housing, a rotor rotatably mounted within the housing and cooperating with the stator, sensor means to generate an electrical signal when there is relative rotation between the stator and the rotor, and means to effect relative movement between the stator and the rotor which is characterized by
   a temperature compensated race type ball bearing having a greater than normal radial separation between the races rotatably and being interposed between the rotor relative to the housing, and
   a spring washer mounted between the housing and the rotor to provide an axial bias of the rotor relative to the housing to accommodate mechanical and thermal environment.

2. Apparatus according to claim 1 where the race separation is between 0.0007 to 0.0009 inches greater than normal.

3. Apparatus according to claim 1 where the race separation is between 0.05 to 0.07 percent of the diameter of the ball bearing.

4. Apparatus according to claim 2 where there are at least two race type ball bearings, and the sensor means generates two separate electrical output signals.

5. Apparatus according to claim 1 where the washer is located at one end of the rotor and the bias is directed toward the other end of the rotor, and said bearings means is located adjacent the other end of the rotor.

6. Apparatus according to claim 1 where the ball bearing is a sealed self-lubricating type and temperature compensation is achieved by the radial race separation which results in a sloppy fit of the balls between the races and allows axial movement of the rotor relative to the stator.

7. Apparatus to achieve a wheel speed signal adapted to be mounted in the wheel and driven by rotation thereof which comprised a housing, a stator fixed within the housing, a rotor rotatably mounted within the housing and cooperating with the stator, sensor means to generate an electrical signal when there is relative rotation between the stator and the rotor, and means to effect relative movement between the stator and the rotor upon rotation of the wheel which is characterized by
   at least one race type ball bearing means rotatably mounting the rotor to the housing which bearing balls are in a loose fit with the races, and
   spring means operatively connecting the rotor and housing for axially biasing the rotor to constantly urge the bearing balls into driving bearing engagement with the races.

* * * * *